Patented Nov. 16, 1943

2,334,630

UNITED STATES PATENT OFFICE 2,334,630

VULCANIZATION OF RUBBER

Paul C. Jones and Roger A. Mathes, Akron, Ohio, assignors to The B. F. Goodrich Company, New York, N. Y., a corporation of New York No Drawing. Application February 8, 1939, Serial No. 255,354

6 Claims. (Cl. 260—789)

This invention relates to the vulcanization of rubber, and to rubber compositions vulcanized in the presence of the accelerators herein described.

It has long been known that rubber may be vulcanized in reduced time in the presence of materials commonly called accelerators. It is an object of this invention to provide a new and exceedingly effective class of accelerators.

It has previously been observed that the class of compounds known as 2-mercaptothiazolines, of which the simplest member has the structural formula

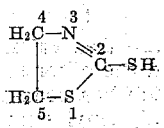

are poor accelerators of vulcanization.

We have disclosed in our copending application Serial No. 255,358, filed February 8, 1939, that 2-mercaptothiazolines are good accelerators when employed in the presence of carboxylic acids and their metallic salts.

We have now discovered that guanidine salts of 2-mercaptothiazolines are excellent accelerators of vulcanization, even in the absence of any carboxylic acid. Mono-, di-, tri- or tetra-substituted thiazolines as well as mono-, di-, tri-, tetra-, and penta-substituted guanidines containing such substituents as methyl, ethyl, isopropyl, isopropenyl, benzyl, cyclohexyl, phenyl, naphthyl, xenyl, tolyl (ortho, meta, or para), indyl, anthryl, phenanthryl, or other hydrocarbon groups as well as compounds containing aliphatic or aromatic groups with non-acid substituents such as alkoxy-alkyl, alkoxy-aryl, nitro-aryl, arxyloxy-aryl, chlor-alkyl, chlor-aryl, aryl-amino-aryl, dialkylamino-aryl, and arylamido-aryl groups may be employed to form the accelerators of this invention. The preferred compounds are the salts of 2-mercaptothiazolines with diaryl guanidines such as diphenyl guanidine.

The guanidine salts of the 2-mercaptothiazolines may be prepared by the methods well known to the art. Thus when solutions of equimolar amounts of 2-mercaptothiazoline and diphenyl guanidine in hot alcohol are combined and allowed to cool, the diphenyl guanidine salt of 2-mercaptothiazoline precipitates. Other methods of preparation such as the reaction between a metallic salt of a 2-mercaptothiazoline and a guanidine hydrochloride may be employed.

As an illustration of the accelerating power of the guanidine salts of 2-mercaptothiazolines, the following rubber compositions were prepared:

| | Composition | |
|---|---|---|
| | A | B |
| Rubber | 100 | 100 |
| Zinc oxide | 5.0 | 5.0 |
| Sulfur | 3.5 | 3.5 |
| Diphenyl guanidine salt of 2-mercaptothiazoline | 1.0 | 1.0 |
| Lauric acid | | 3.0 |

When these compositions were vulcanized in a heated mold for varying times at 287° F., compositions having the following tensile strengths in pounds per square inch and elongations in per cent were obtained:

| Time of cure in minutes | Composition | | | |
|---|---|---|---|---|
| | A | | B | |
| | T | E | T | E |
| 15 | 3,930 | 855 | 4,080 | 840 |
| 30 | 4,400 | 800 | 4,220 | 765 |

It will be observed that although the lauric acid had a slight activating effect, the diphenyl guanidine salt of 2-mercaptothiazoline was itself an excellent accelerator. Similar results may be obtained by employing as accelerators other guanidine salts of 2-mercaptothiazolines as disclosed above.

It is not essential to the successful practice of our invention that the salts be prepared prior to the incorporation in the rubber composition. Thus, if 2-mercaptothiazoline and diphenyl guanidine are incorporated in a rubber composition, the salt will be formed in situ during vulcanization and the rate of cure of the composition will approximate that which would have been obtained had the salt been prepared before incorporation in the rubber.

Although the use of the accelerators of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc., may be vulcanized in the presence of the accelerators herein described. The accelerator may be incorporated in the rubber by mastication, milling, or any similar process, or in the case of latex, rubber cement, or any other natural or artificial dispersion or solution of rubber by simply dissolving or suspending the accelerator therein.

The vulcanization may be performed in other manners than that particularly set forth in the specific examples; specifically, rubber compositions may be heated in the presence of sulfur or selenium in hot air, steam, hot water, etc.

It is to be understood that the term "a rubber" is employed in the appended claims in a generic sense to designate those rubbery materials which are vulcanizable with sulfur, including caoutchouc, balata, gutta percha, latex, rubber isomers, or synthetic rubber whether or not admixed with pigments, fillers, softeners, antioxidants, other accelerators, etc., but not including materials incapable of vulcanization by reaction with sulfur.

While we have herein disclosed specific embodiments of our invention, we do not intend to limit ourselves solely thereto, for it will be obvious to those skilled in the art that many modifications such as using other materials having equivalent properties and varying the proportions of materials used are within the spirit and scope of the invention as defined in the appended claims.

We claim:

1. The process which comprises vulcanizing a rubber in the presence of a 2-mercaptothiazoline salt of a hydrocarbon substituted guanidine which has the structure

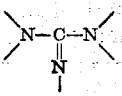

in which those of the free valences which are not occupied by hydrocarbon groups are occupied by hydrogen.

2. The process which comprises vulcanizing a rubber in the presence of 2-mercaptothiazoline salt of a diaryl guanidine which has the structure

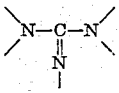

in which two of the free valences are occupied by aryl groups and the other three by hydrogen.

3. The process which comprises vulcanizing a rubber in the presence of the diphenyl guanidine salt of 2-mercaptothiazoline.

4. A rubber which has been vulcanized in the presence of a 2-mercaptothiazoline salt of a hydrocarbon substituted guanidine which has the structure

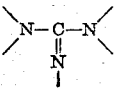

in which those of the free valences which are not occupied by hydrocarbon groups are occupied by hydrogen.

5. A rubber which has been vulcanized in the presence of 2-mercaptothiazoline salt of a diaryl guanidine which has the structure

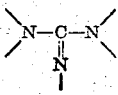

in which two of the free valences are occupied by aryl groups and the other three by hydrogen.

6. A rubber which has been vulcanized in the presence of the diphenyl guanidine salt of 2-mercaptothiazoline.

PAUL C. JONES.
ROGER A. MATHES.

CERTIFICATE OF CORRECTION.

Patent No. 2,334,630.  November 16, 1943.

PAUL C. JONES, ET AL.

It is hereby certified that error appears in the printed specification of the above numbered patent requiring correction as follows: Page 1, first column, line 38, for "arxyloxy-aryl" read --aryloxy-aryl--; page 1, second column, in the first formula, last line thereof, for the figure "1" under "A", opposite "Lauric acid", read --O--; and that the said Letters Patent should be read with this correction therein that the same may conform to the record of the case in the Patent Office.

Signed and sealed this 1st day of February, A. D. 1944

Henry Van Arsdale,
Acting Commissioner of Patents.

(Seal)